United States Patent [19]
Dixon

[11] 3,887,577
[45] June 3, 1975

[54] PROCESS FOR THE PREPARATION OF 2-IMINO DERIVATIVES OF SUBSTITUTED IMIDAZOLES

[75] Inventor: William D. Dixon, Kirkwood, Mo.

[73] Assignee: Monsanto Company, St. Louis, Mo.

[22] Filed: July 5, 1973

[21] Appl. No.: 376,493

[52] U.S. Cl. ................................ 260/309.6; 71/92
[51] Int. Cl. ............................................ C07d 49/36
[58] Field of Search ................................ 260/309.6

[56] References Cited
OTHER PUBLICATIONS
Burmistrov et al., C. A., Vol. 62: 14657, (1965).

Primary Examiner—Henry R. Jiles
Assistant Examiner—C. M. S. Jaisle
Attorney, Agent, or Firm—William I. Andress; Donald W. Peterson; Neal E. Willis

[57] ABSTRACT

A class of 2-imino derivatives of substituted imidazoles are prepared by the reaction of a 4-imidazolin-2-one with phosphorus oxychloride and a primary amine. Representative of this class is 1-isopropyl-2-methylimino-3-(3,4-dichlorophenyl)-4-methyl-4-imidazoline.

11 Claims, No Drawings

PROCESS FOR THE PREPARATION OF 2-IMINO DERIVATIVES OF SUBSTITUTED IMIDAZOLES

This invention relates to a new method of preparing a class of imidazole derivatives which are useful for regulating the natural growth or development of plants.

Compounds which can be prepared using the method of this inventon are 2-imino derivatives of imidazoles and the strong acid salts thereof represented by the formula (1) 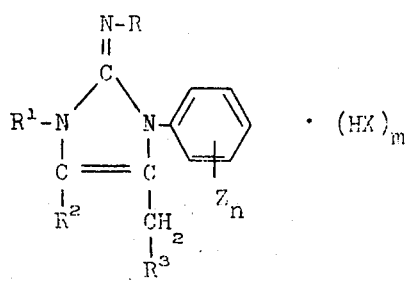 · $(HX)_m$ wherein R is lower alkyl or lower alkoxy lower alkyl, $R^1$ is lower alkyl, $R^2$ is lower alkyl or, preferably, hydrogen, $R^3$ is lower alkyl or, preferably, hydrogen, Z is fluoro, chloro, bromo, lower alkyl, halo lower alkyl or lower alkoxy, $n$ is an integer 0 through 2, $m$ is 0 or 1 and X is the anionic moiety of a strong acid.

As employed herein, the term lower designates those aliphatic radicals of not more than 4 carbon atoms in straight or branched chain. Representative lower alkyl substituents are methyl, ethyl, propyl, isopropyl, butyl, tert. butyl and the like. Where the substituent is alkoxy, it can be methoxy, ethoxy, propoxy, isopropoxy, butoxy, sec. butoxy and the like. When $n$ is 2 the substituents represented by Z can be like or unlike.

The acid salts of the compounds of formula (1) are derived from inorganic and organic acids having a dissociation constant greater than about $5\times10^{-2}$ and are, for example, the hydrochloride, hydrobromide, hydroiodide, hydrosulfate, perchlorate, dichloroacetate, trichloroacetate, oxalate, maleate, picrate and the like. Preferred salts are the hydrohalides, such as the hydrochloride and the oxalate.

The method of preparing a class of 2 imino derivatives of substituted imidazole provided by this invention comprises the reaction of a substituted 4-imidazolin-2-one with phosphorus oxychloride and a primary amine. This method is shown schematically as follows.

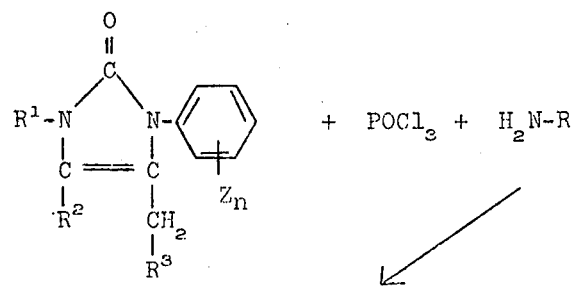 + $POCl_3$ + $H_2N-R$

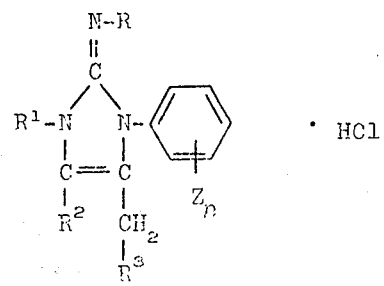 · HCl wherein R, $R^1$, $R^2$, $R^3$, Z and $n$ are as previously defined.

This new method is economical, providing good yields, and is particularly advantageous on a commercial scale since prior methods of preparing these compounds require the use of alkynylderivatives which are highly unstable and the explosive properties of the alkynyl precursors requires the use of costly safeguards. Thus, the instant invention overcomes this limitation of the methods described in my copending application Ser. No. 329,788, filed Feb. 5, 1973.

The method of preparing the 4-imidazolin-2-one precursors used in this process without the use of derivatives derivaties is described in the joint application of W. D. Dixon and B. R. Dangerfield, entitled "Preparation of 4-Imidazolin-2-Ones," filed concurrently herewith. Ser. No. 376,494 filing date July 5, 1973. The description of the preparation of the 4-imidazolin-2-ones in said application, Ser. No. 376,494 is incorporated herein by reference for convenience and not to obscure the instant invention.

In practicing the method of the instant invention the use of phosphorus oxychloride is critical. Although other agents were tried they precluded the formation of the instant 2-imino derivatives upon treatment with the primary amine. Generally, excess phosphorus oxychloride is used in place of solvent. The excess phosphorus oxychloride is usually removed prior to the addition of the primary amine to avoid the use of uneconomical amounts of the amine.

It is necessary to employ elevated temperatures to obtain good yields, for example, about about 40° C up to the reflux temperature of the sytems. Optimum yields are obtained at reflux temperature which is preferred. The pressure employed to carry out the reaction is not critical and can range from subatmospheric to superatmospheric. Usually, the reaction is conducted at normal atmospheric pressure for convenience which provides good yields. Suitable solvents which can be employed in the method of this invention are, for example, haloalkanes, such as, methylene chloride, chloroform, carbontetrachloride and the like.

The 2-imino derivatives of imidazoles prepared by the method of this invention are recovered by employing conventional means, such as, filtration, vacuum stripping, washing and the like. In practicing the method of this invention the compounds of formula (1) wherein X is chloride are directly obtained. These products can be basified with a suitable base, such as, sodium hydroxide to obtain compounds where m is zero, i.e. the free base, which can be readily treated with other strong acids to prepare the desired salt.

The following examples are presented to further illustrate this invention. Parts and percentages are by weight and temperature in degrees centigrade unless otherwise specified.

EXAMPLE I

Preparation of 1-isopropyl-2-methylimino-3-(3,4-dichlorophenyl)-4-methyl-4-imidazoline hydrochloride:

To a three neck flask equipped with a stirrer, reflux condenser and addition funnel is charged 5.7g (0.02 mol) of 1-isopropyl-3-(3,4-dichlorophenyl)-4-methyl-4-imidazolin-2-one in 30 ml of phosphorus oxychloride and heated to reflux. Anhydrous hydrogen chloride gas is slowly bubbled into the solution over a period of about 13 hours. The reaction is cooled and the excess hydrogen chloride and phosphorus oxychloride is removed in vacuuo. The product is dissolved in 50 ml of methylene chloride and excess anhydrous methylamine gas is bubbled into the solution at reflux temperature over a period of about one hour. The reaction is filtered and the filtrate is stripped in vacuuo and crystallized upon scratching to give 5.0g (75% yield) of product. NMR spectral anaylsis confirmed the following structure.

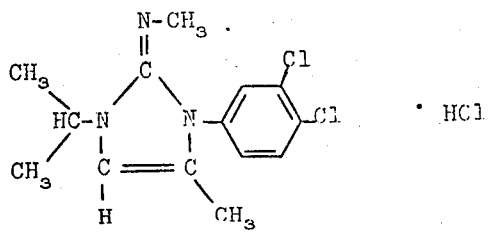

Upon recrystallization chloroform-ethyl acetate, mp 237°-240° C was determined using Mel Temp apparatus.

Anal, Calcd. for $C_{14}H_{18}N_3Cl_3$: C, 50.24; H, 5.42; N, 12.56; Cl, 31.78. Found: C, 50.34; H, 5.42; N, 12.64; Cl, 31.85.

Although hydrogen chloride gas was used in the preparation in Example I it is not required in the practice of this invention as is demonstrated by the following examples.

EXAMPLE II

Preparation of 1-isopropyl-2-(3-methoxypropyl) imino-3-(3,4-dichlorophenyl)-4-methyl-4-imidazoline oxalate:

To a suitable vessel equipped with a stirrer, reflux condenser and addition funnel is charged 5.7g (0.02 mol) of 1-isopropyl-3-(3,4-dichlorphenyl)-4-methyl-4-imidazolin-2-one in 30 ml phosphorus oxychloride and heated to reflux temperature with stirring for about 4 hours. Excess phosphorus oxychloride is pulled off under vacuum and 75 ml of methylene chloride is added. With stirring and at reflux temperature 0.2 mol of methoxypropylamine in 30 ml of methylene chloride is added dropwise over a period of about twenty minutes. After an additional 45 minutes the solvent is removed in vacuuo. The hydrochloride product obtained is dissolved in 50 ml of water and extracted twice with 25 ml portions of diethyl ether. The aqueous layer is cooled over ice and approximately 50 ml of 10% sodium hydroxide is added. The free base is purified by extracting with diethyl ether (3×50 ml) washing with water (2×30 ml) drying over anhydrous magnesium sulfate and placing under high vacuum for 10 minutes. The free base (6.18g) is then dissolved in 5 ml acetone, cooled and one equivalent of oxalic acid dihydrate in 10 ml of acetone is added. About 50 ml of ethyl acetate is added and the product crystallizes. The mixture is cooled filtered and dried to give 6.3g (71% yield) of product having the following structure which is confirmed by NMR spectral analysis.

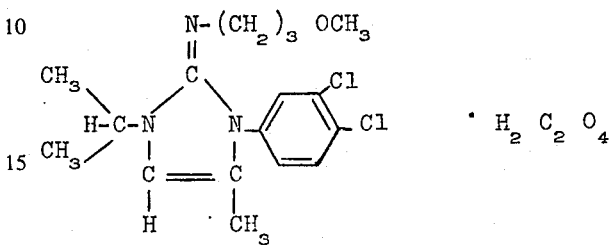

EXAMPLE III

Preparation of 1-isopropyl-2-(3-methoxypropyl) imino-3-phenyl-4-imidazoline oxalate:

To a suitable vessel equipped with a stirrer, reflux condenser and addition funnel is charged 206.5 g (0.95 mol) of 1-isopropyl-3-phenyl-4-methyl-4-imidazolin-2-one in 1100 ml of phosphorus oxychloride and is heated to reflux with stirring for about 5 hours. Excess phosphorus oxychloride is removed under high vacuum. About 1000 ml of methylene chloride is added and heated to reflux and 890 g of methoxypropylamine is slowly added over a period of 1.5 hours and held at reflux with stirring for 3 hours. The reaction is cooled and the solvent is removed in vacuuo. The hydrochloride salt is dissolved in 1000 ml water and extracted with 3×250 ml of diethyl ether. The aqueous layer is made basic by the addition of 1500 g of cold 25% sodium hydroxide solution and then extracted with 5×200 ml of diethyl ether, dried over magnesium sulfate and subjected to high vacuum to remove any residual methoxypropyl amine. Approximately 204.7g of the free base is obtained which is dissolved in 200 ml of acetone and a solution of 94 g of oxalic acid dihydrate in about 300 ml of acetone is added. The solution is diluted with an equal volume of ethyl acetate and cooled to provide 181 g. of product. The mother liquor is evaporated and the residue recrystallized from isopropanol to give an additional 11.6 g of product for total yield of 192.6 g NMR spectral analysis of the product confirmed the following structure.

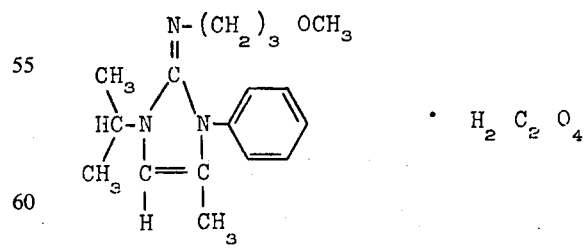

EXAMPLE IV

Preparation of 1-methyl-2-(3-methoxypropy)imino-3-(3,4-dichlorophenyl)-4-methyl-4-imidazoline oxalate.

To a suitable vessel equipped with a stirrer, reflux condenser and addition funnel is charged about 25.7 g (0.1 mol) of 1-methyl-3-(3,4-dichlorophenyl)-4-methyl-4-imidazolin-2-one in 125 ml of phosphorus oxychloride and heated to reflux temperature with stirring for a period of about 10 hours. The reaction is cooled and excess phosphorus oxychloride is removed under vacuum and 300 ml of methylene chloride is added and heated to reflux while slowly adding 89.14 (1.0 mol) of 3-methoxypropylamine with stirring and maintained at reflux for about 2 hours. The reaction is cooled and the solvent is removed in vacuuo. The resulting hydrochloride product is dissolved in 250 ml of water and extracted with 2×125 ml of ether. The aqueous layer is cooled and about 160 g of 25% aqueous sodium hydroxide is added. The solution is extracted with 3×150 ml of diethyl ether, dried over magnesium sulfate filtered and the solvent is removed under vacuum. The free base obtained 22.7 g is dissolved in 50 ml of acetone and 8.7 g oxalic acid dihydrate in 60 ml of acetone is added which provides 26.7 g of product. NMR spectral analysis of the product, mp 151°–154°, confirms the following structure.

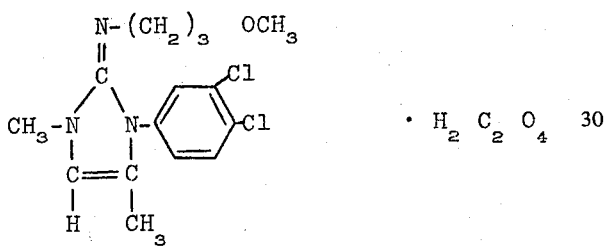

Using the procedure set forth in Example IV but replacing the 4-imidazolin-2-one with other appropriate imidazolin-2-ones or replacing the amine with other appropriate amines the following compounds are prepared.

V. 1-Isopropyl-2-n-butylimino-3-(3,4-dichlorophenyl)-4-methyl-4-imidazoline oxalate, mp 158°–161°

VI. 1-Propyl-2-(3-methoxypropyl)imino-3-(3,4-dichlorophenyl)-4-methyl-4-imidazoline oxalate, mp 116°–119°

VII. 1-Butyl-2-(3-methoxypropyl)imino-3-(3,4-dichlorophenyl)-4-methyl-4-imidazoline oxalate, mp 118°–122°

VIII. 1-Methyl-2-(3-methoxypropyl)imino-3-phenyl-4-methyl-4-imidazoline oxalate, mp 131°–133°

IX 1-Isopropyl-2-(3-methoxypropyl)imino-3-(3-trifluoromethylphenyl)-4-methyl-4-imidazoline oxalate, mp 95°–99°

X. 1-Methyl-2-(3-isopropoxypropyl)imino-3 phenyl-4-methyl-4-imidazoline oxalate, mp 133°–135°

The compounds of formula (1) prepared in accordance with the method of this invention are effective for regulating the natural growth or development of plants. The compounds of the foregoing examples when applied to representative plants, such as soybeans, at various stages of growth, elicit a growth regulation response. The treated plants develop a darker green foliar color and develop into more effective plants. Further details of the beneficial properties of the compounds are found in pending application Ser. No. 329,787, filed Feb. 5, 1973, by W. D. Dixon and G. L. Eilrich.

Although this invention has been described with respect to specific modification, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A process for preparing a compound of the formula

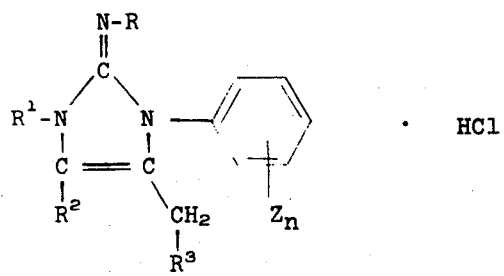

wherein: R is lower alkyl or lower alkoxy lower alkyl, $R^1$ is lower alkyl; $R^2$ is lower alkyl or hydrogen; $R^3$ is lower alkyl or hydrogen; Z is fluoro, chloro, bromo, lower alkyl, halo lower alkyl, or lower alkoxy and n is an integer zero through 2, which comprises reacting at temperatures from about 40°C. up to the reflux temperature of the system a 4-imidazolin-2-one of the formula

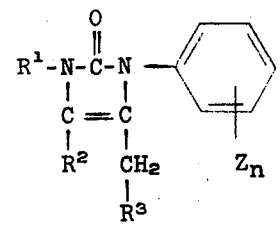

wherein $R^1$, $R^2$, $R^3$, Z and n are as defined above, with phosphorus oxychloride and a primary amine of the formula $H_2N$—R wherein R is as defined above.

2. The process of claim 1 which comprises as a first step the reaction of the 4-imidazolin-2-one in an excess of phosphorus oxychloride at reflux temperature and as a second step the removal of excess phosphorus oxychloride and reacting the product with an excess of the primary amine in an inert solvent at an elevated temperature.

3. The process of claim 2 wherein the elevated temperature is the reflux temperature of the system.

4. The process of claim 2 wherein the solvent is methylene chloride.

5. The process of claim 2 wherein the 4-imidazolin-2-one is of the formula

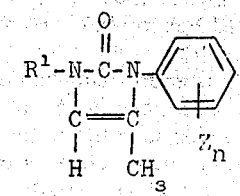

wherein R¹ is lower alkyl; Z is fluoro, chloro, bromo, lower alkyl, halo lower alkyl, or lower alkoxy; and $n$ is an integer zero through 2.

6. The process of claim 5 wherein the 4-imidazolin-2-one is 1-isopropyl-3-(3,4-dichlorophenyl)-4-methyl-4-imidazolin-2-one.

7. The process of claim 5 wherein the primary amine is methoxypropylamine.

8. The process of claim 6 wherein the primary amine is methylamine.

9. The process of claim 6 wherein the primary amine is methoxypropyl amine.

10. The process of claim 7 wherein the 4-imidazolin-2-one is 1-isopropyl-3-phenyl-4-methyl-imidazolin-2-one.

11. The process of claim 7 wherein the 4-imidazolin-2-one is 1-methyl-3-(3,4-dichlorophenyl)-4-methyl-4-imidazolin-2-one.

* * * * *